United States Patent [19]

Yazawa

[11] Patent Number: 5,602,606
[45] Date of Patent: Feb. 11, 1997

[54] FRAME MASKING MECHANISM

[75] Inventor: Kazuki Yazawa, Tokyo, Japan

[73] Assignee: Asahi Kogaku Kogyo Kabushiki Kaisha, Tokyo, Japan

[21] Appl. No.: 523,638

[22] Filed: Sep. 5, 1995

[30] Foreign Application Priority Data

Sep. 2, 1994 [JP] Japan .................... 6-234308

[51] Int. Cl.⁶ .................... G03B 17/02; G03B 37/00
[52] U.S. Cl. .................... 396/435
[58] Field of Search .................... 354/94, 159

[56] References Cited

U.S. PATENT DOCUMENTS

| | | | |
|---|---|---|---|
| 5,010,357 | 4/1991 | Misawa | 354/159 |
| 5,255,030 | 10/1993 | Mukai et al. | 354/94 |
| 5,298,929 | 3/1994 | Tsunefuji et al. | 354/159 |
| 5,335,031 | 8/1994 | Ogawa | 354/159 |
| 5,345,285 | 9/1994 | Hasushita et al. | 354/159 |
| 5,386,259 | 1/1995 | Ichikawa et al. | 354/94 |
| 5,493,356 | 2/1996 | Tokui | 354/159 |

*Primary Examiner*—Safet Metjahic
*Assistant Examiner*—Eddie C. Lee
*Attorney, Agent, or Firm*—Greenblum & Bernstein, P.L.C.

[57] ABSTRACT

A frame opening of a camera image area is maskable in both horizontal and vertical directions using L shaped masks, each L shaped mask able to mask adjacent sides of the frame, and diagonally oppositely arranged. The masks are driven by a disk member rotatable by the user, and are linked together to mask the top and bottom and/or left and right sides of the frame. The rotating disk may unidirectionally mask the vertical or horizontal portions of the frame or all four sides of the frame.

22 Claims, 6 Drawing Sheets

F1: VERTICAL SIDES MASKED

F2: VERTICAL SIDES MASKED
HORIZONTAL SIDES MASKED

F3: NO MASKING

F4: HORIZONTAL SIDES MASKED

FRAME MASKING MECHANISM

BACKGROUND OF THE INVENTION

The present invention relates to mechanisms for changing the format, including frame size and shape, of pictures taken in a camera.

Modern compact cameras are sometimes equipped with a mechanism to change the format of an exposed frame by masking part of a full frame opening at the film plane. "Format", in this case, is defined as the shape and size of an exposed frame. A wide, narrow format is commonly referred to as "panoramic" format, and conventional masking mechanisms are capable of masking top and bottom sides of a full frame area to achieve the panoramic format.

However, the conventional mechanisms are limited to the single panoramic format, and are not capable of masking the sides as well as the top and bottom, to provide a greater range of selectable formats.

SUMMARY OF THE INVENTION

It is therefore an object of the present invention to provide an improved masking mechanism to enable the control of a frame size in both vertical and horizontal directions. It is a further object of the invention to be able to control a frame size in different combinations of vertical and horizontal directions.

In order to achieve the objects of the invention, a frame masking mechanism for a camera includes a rectangular frame opening formed in the camera for defining a largest image formed by light admitted to a film plane of the camera, horizontal side masking units for masking the frame opening at horizontal sides of the frame opening by blocking light at the horizontal sides of the frame opening, vertical side masking units for masking the frame opening at vertical sides of the frame opening by blocking light at the vertical sides of the frame opening. The frame masking mechanism also includes a device for unidirectionally moving either of the horizontal and the vertical side masking units to mask the frame opening at one of the horizontal sides and the vertical sides of the frame opening, a device for cooperatively moving both of the horizontal and the vertical side masking units together to mask the frame opening at both of the horizontal sides and the vertical sides of the frame opening and an operating member for selectively operating the unidirectionally moving device and the cooperatively moving device.

In this manner, the mechanism is able to mask frames to have four different kinds of possible frame formats by masking the frame opening at vertical, horizontal, neither, or both sides of the frame opening.

According to another aspect of the invention, a frame masking mechanism for a camera includes a rectangular frame opening formed in the camera for defining a largest image formed by light admitted to a-film plane of the camera, a first L shaped masking member for masking two adjacent sides of the frame opening by blocking light at the adjacent sides of the frame, and a second L shaped masking member for masking two remaining adjacent sides of the frame opening by blocking light at the remaining adjacent sides of the frame. The frame masking mechanism also includes a device for horizontally moving the first and second L shaped masking members in mutually opposite horizontal directions to mask horizontal sides the frame opening, a device for vertically moving the first and second L shaped masking members in mutually opposite vertical directions to mask vertical sides of the frame opening, and a selector for operating the horizontally moving device and the vertically moving device, to unidirectionally move the first and second L shaped masking member to mask the frame opening only at the horizontal sides, to unidirectionally move the first and second L shaped masking members to independently mask the frame opening only at the vertical sides, and to move the first and second L shaped masking members to cooperatively mask the frame opening at both of the horizontal and the vertical sides.

Accordingly, moving the L shaped frames only horizontally or vertically, or together horizontally and vertically, allows no masking, horizontal masking, vertical masking, and four-sided masking while using only two masking members. Preferably, the vertically moving device includes a first driving member provided to the selector for driving at least one of the first and second L shaped masking members in a vertical direction and a first linkage linking the first and second L shaped masking members to move in mutually opposite vertical directions. Symmetrically, the horizontally moving device includes a second driving member provided to the selector for driving at least one of the first and second L shaped masking members in a horizontal direction and a second linkage linking the first and second L shaped masking members to move in mutually opposite horizontal directions.

The linkages allow the L shaped members to be moved in unison in mutually opposite directions. The selector may further include a third driving member for driving at least one of the first and second L shaped masking members in a vertical direction while the second driving member drives the at least one of the first and second L shaped masking members in the horizontal direction. In this case, both vertical and horizontal masking are achieved when the second and third driving members are used in concert.

According to still another aspect of the invention, a frame masking mechanism for a camera includes a rectangular frame opening formed in the camera for defining a largest image formed by light admitted to a film plane of the camera, a first L shaped masking member for masking two adjacent sides of the frame opening by blocking light at the adjacent sides of the frame, and a second L shaped masking member for masking two remaining adjacent sides of the frame opening by blocking light at the remaining adjacent sides of the frame. A driving disk is included for selectively driving at least one of the first and second L shaped masking members to mask the frame opening in only a vertical direction, driving at least one of the first and second L shaped masking members to mask the frame opening in only a horizontal direction, and driving at least one of the first and second L shaped masking members to mask the frame opening in both a vertical direction and a horizontal direction. Also included in the frame masking mechanism is a first linkage for moving the second L shaped masking member and the first L shaped masking member in mutually opposite horizontal directions in response to a horizontal movement of one of the first and second L shaped masking members and a second linkage for moving the second L shaped masking member and the first L shaped masking member in mutually opposite vertical directions in response to the vertical movement of one of the first and second L shaped masking members. The use of the driving disk and linkages allows a rotation of the driving disk to move the L shaped members in mutually opposite horizontal and vertical directions, or in both directions at once.

The driving disk my include a first boss provided to a periphery of the driving disk for contacting and vertically moving the first L shaped masking member in response to a rotation of the driving disk, a second boss provided to the periphery of the driving disk for contacting and horizontally moving the first L shaped masking member in response to a rotation of the driving disk, and a third boss provided to a periphery of the driving disk for contacting and vertically moving the first L shaped masking member, while the second boss is horizontally moving the first L shaped masking member, in response to a rotation of the driving disk. In this case, the first boss contacts and moves the first L shaped mask in response to a rotation of the driving disk in a first direction, and the second boss contacts and moves the first L shaped mask in response to a rotation of the driving disk in a second direction opposite to the first direction, and the third boss contacts and moves the first L shaped mask in response to a further rotation of the driving disk in the second direction. Accordingly, the three driving bosses can be used to achieve all four possible masking formats, and positions in between, when the driving disk is rotated. Thus, the mechanism is implemented with a single operating dial and only two masking members.

DESCRIPTION OF THE ACCOMPANYING DRAWINGS

DESCRIPTION OF THE EMBODIMENTS

Figure 1:
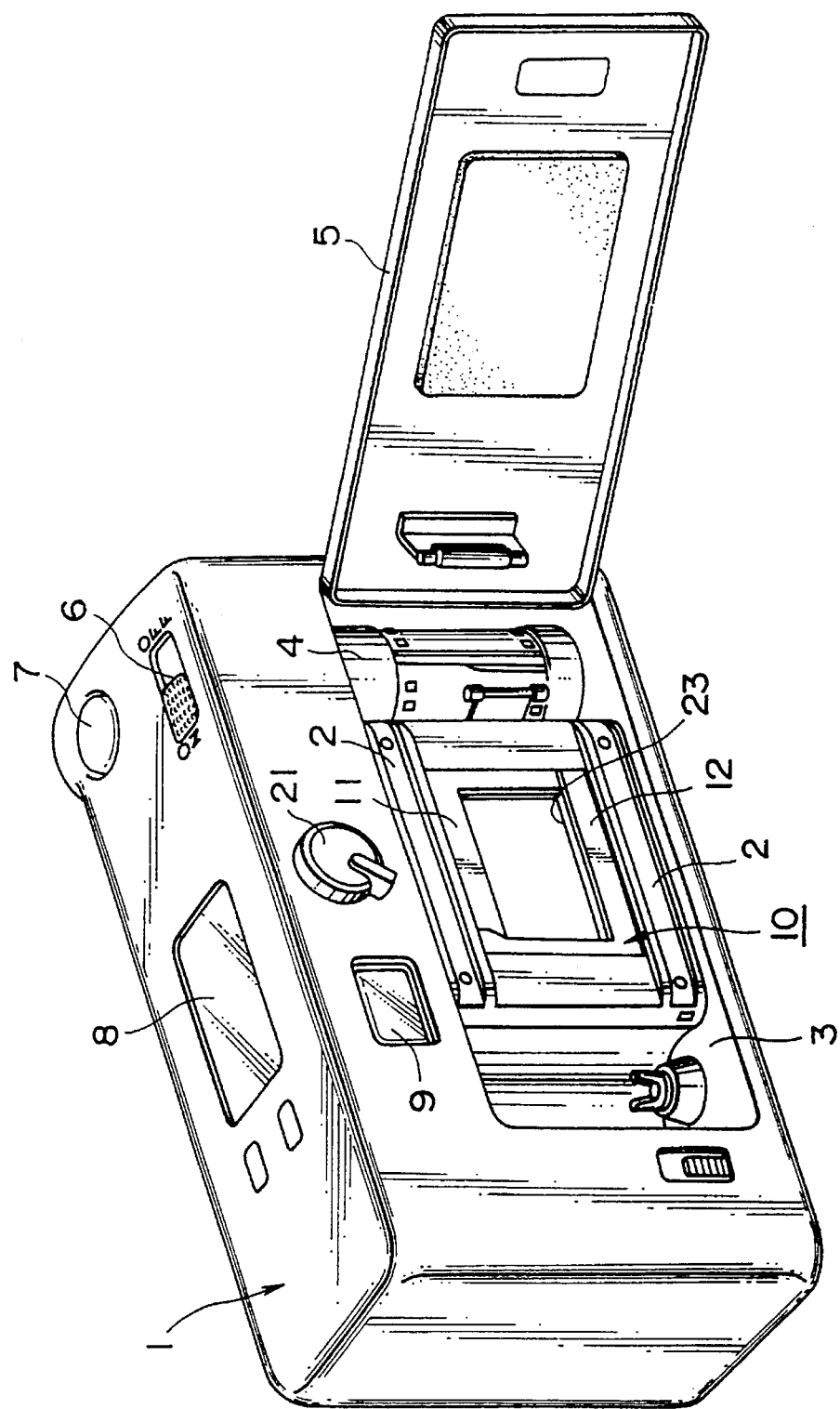
FIG. 1 is a perspective view of a camera to which a first embodiment of a frame masking mechanism according to the invention is applied.

FIG. 1 shows a compact camera 1 to which an embodiment of a frame masking mechanism 10 according to the present invention is applied. The frame masking mechanism 10 is positioned within the camera 1 between a pair of film guide rails 2 and a frame opening 23, close to the film plane of the camera. A film cartridge chamber 3 and spool chamber 4 are placed on either lateral side of the frame opening 23. A film placed in the camera 1 is drawn from a cartridge (not shown) held in the cartridge chamber 3, across the guide rails 2 to cover the frame opening 23, and is taken up in the spool chamber 4. A camera back 5 is then closed to seal the film in the camera 1. A main switch 6, shutter release button 7, and LCD panel 8 are positioned on the upper surface of the camera 1. A finder 9 and format selector dial 21 are provided on the back of the camera 1.

Although the frame masking mechanism 10 is shown applied only at the film plane of the camera, the mechanism 10 can also be applied to a viewfinder in the camera.

Figure 2:
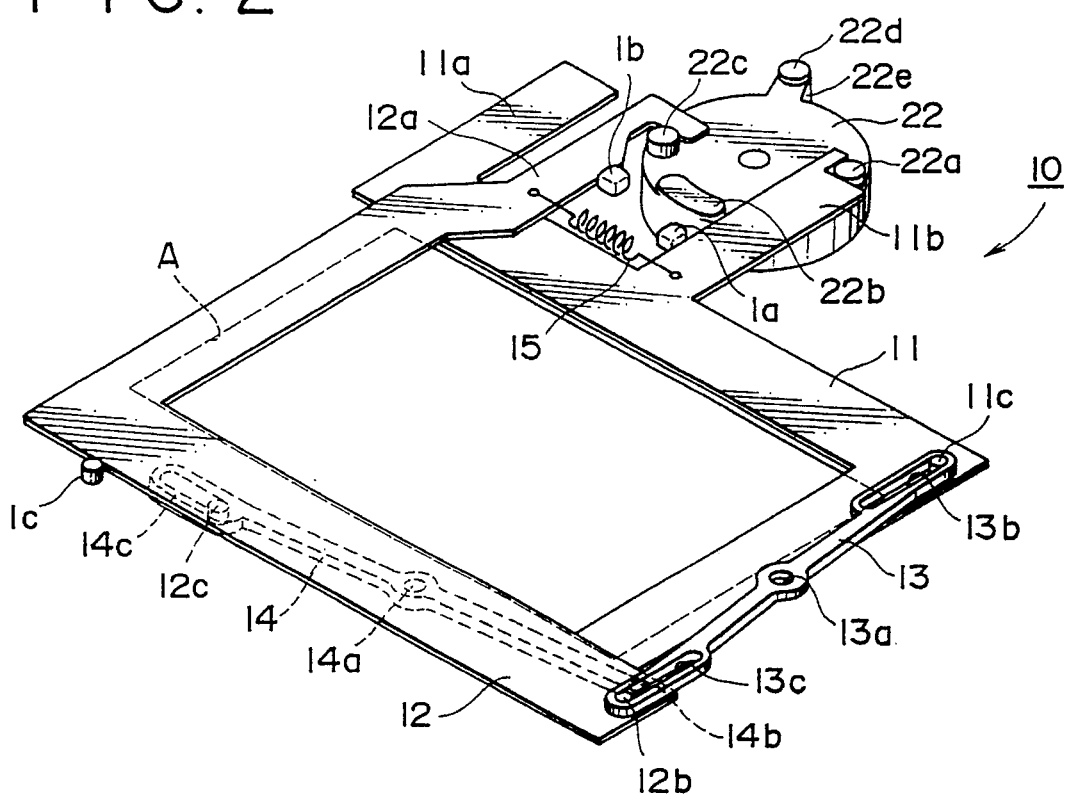
FIG. 2 is a perspective view of the first embodiment of a frame masking mechanism.
Figure 3:
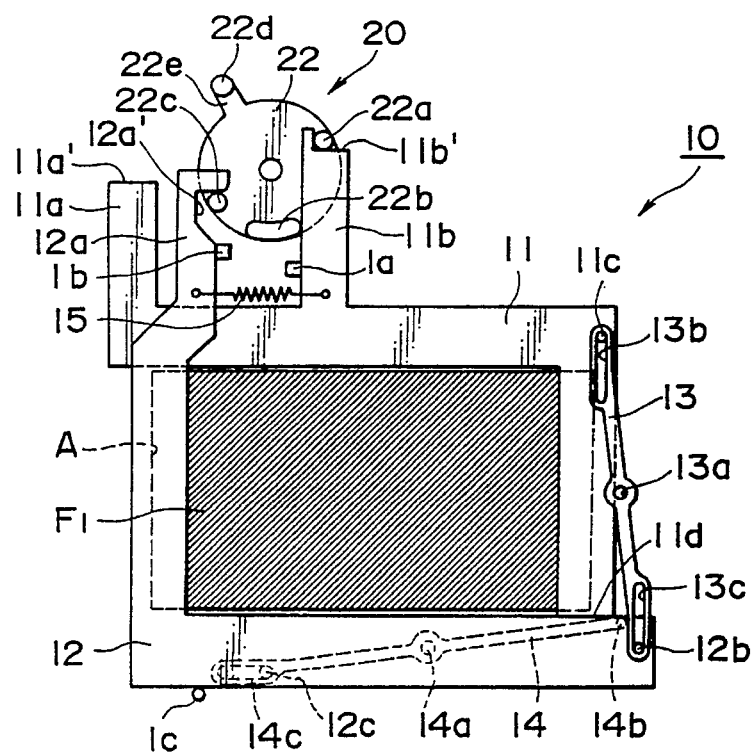
FIG. 3 is a plan view of the first embodiment of a frame masking mechanism showing a neutral position and a first frame format area F1 setting.

The frame masking mechanism 10 appears in a perspective view in FIG. 2 and in a plan view in FIG. 3. A frame area A represents the full frame area available, as defined by the walls of the frame opening 2–3. A first masking member 11 and second masking member 12 each include substantially L-shaped masking portions. The first L-shaped masking member 11 is positioned with the two arms of the L shape thereof extending along adjacent sides of the frame area A (in this case, the upper and right sides of the frame area A, from the viewpoint of FIG. 3). The second L-shaped masking member 12 is positioned, with the two arms of the L shape thereof extending along adjacent sides of the full frame area A opposite to those of the first masking member 11 (in this case, the lower and left sides of the frame area A, from the viewpoint of FIG. 3). As shown in FIG. 2, each masking member 11, 12 is substantially flat, and the second masking member 12 overlays the first masking member 11.

Thus, the first masking member 11 defines one horizontal and one vertical boundary of a frame format area Fn within the full frame area A, while the second masking member 12 defines the remaining horizontal and vertical boundaries of the frame format area Fn (where Fn is one of F1 through F4, shown in FIGS. 3 through 6). In FIGS. 2 and 3, the masking members 11 and 12 are positioned in a neutral position defining a predetermined format area, herein referred to as standard format area F1.

The first masking member 11 includes first and second driven arms 11a and 11b, both extending vertically from the upper portion of the masking member 11. The first driven arm 11a includes a linking surface 11a' formed at its distal end. The second driven arm 11b includes a stepped portion 11b' formed in the distal end thereof. The first masking member 11 is also provided with a top link pin 11c.

The second masking member 12 includes a hook arm 12a. The hook arm 12a has a hook 12a' formed therein. The second driven arm is further provided with a bottom link pin 12b and a driven link pin 12c. The driven link pin 12c protrudes from the inward face of the second masking member.

A driving mechanism 20 is linked to and drives both of the masking members 11 and 12 between discrete positions, each discrete position defining one of the predetermined format areas Fn. The driving mechanism includes a rotatably mounted disk member 22 having a plurality of driving members. The format selector dial 21, shown in FIG. 1, is coaxially fixed to the disk member 22 so that the disk member 22 is rotated when the user rotates the format selector dial 21. A first driving pin 22a and a second driving pin 22c project from the face of the disk member 22 at positions opposite to one another near the circumference of the disk member 22. Furthermore, an arcuate driving member 22b projects from the face of the disk member 22 along the circumference of the disk member, and an outboard driving pin 22d projects from an arm 22e extending in the radial direction away from the disk axis. The outboard driving pin 22d projects in the direction away from the face of the disk member 22. Thus, the driving member and pins 22a, 22b, 22c, 22d each extend in the same direction, away from the face of the disk member 22.

As shown in FIG. 2, the disk member 22 is positioned behind the masking members 11 and 12, with the disk member 22 face substantially parallel to the two masking members 11 and 12. The disk member 22 is further arranged in the vicinity of the driven arms 11a and 11b and hook arm 12a so that the driving member and pins 22a, 22b, 22c, and 22d may contact and move operative surfaces of the driven arms 11a, 11b and hook arm 12a. The driving member and pins 22a, 22b, 22c, 22d each extend towards the overlapping masking members 11 and 12. The first driving pin 22a, outboard driving pin 22d, and arcuate driving member 22b extend only far enough to be able to contact portions of the first masking member 11, while the second driving pin 22c extends beyond the first masking member 11 and is able to contact portions of the second masking member 12.

The contact surface 11a' of the first driven arm 11a of the first masking member 11 is a upwardly facing horizontal surface, and is selectively pushed and moved by the outboard driving pin 22d when the disk member 22 is appropriately rotated. The stepped portion 11b' of the second driven arm 11b of the first masking member 11 has a upwardly facing horizontal surface to be selectively pushed and moved by the first driving pin 22a when the disk member 22 is appropriately rotated, and a rising portion to be selectively pushed and moved by the arcuate driving member 22b when the disk member 22 is appropriately rotated. Furthermore, the hook 12a' of the hook arm 12a of the second masking member 12 is a downwardly facing horizontal surface, to be selectively pulled and moved by the second driving pin 22c when the disk member 22 is appropriately rotated.

A first regulating member 1a and a second regulating member 1b are positioned between the second driven arm 11b of the first masking member 11 and the hook arm 12a of the second masking member 12. The first regulating member 1a regulates the movement of the second driven arm 11b in the horizontal direction, and the second regulating member 1b regulates the movement of the hook arm in the horizontal direction. The second driven arm 11b and the hook arm 12a may slide vertically along the first and second regulating members 1a and 1b, respectively. Furthermore, the second driven arm 11b and the hook arm 12a may each move horizontally away from the first and second regulating members 1a and 1b, respectively, A third regulating member 1c regulates the movement of the second driven arm 11b in the vertical direction. The second driven arm 11b may slide horizontally along the third regulating member 1c. Furthermore, the second driven arm 11b my move vertically away from the third regulating member 1c and towards the full frame area A.

A pivotable connecting rod 13 links the first and second masking members 11 and 12 via top and bottom link pins 11c and 12b, respectively. The connecting rod 13 pivots about an axis pin 13a connected to the camera body at its approximate lengthwise center. The axis pin 13a is positioned on the level of the vertical center of the full frame area A. The top link pin 11c is slidable within a top link groove 13b formed in the connecting rod 13, and the bottom link pin 12b is slidable within a bottom link groove 13c formed in the connecting rod 13. The link grooves 13b, 13c are symmetric about the axis pin 13a, and are arranged to extend vertically when the frame masking mechanism is the neutral position defining standard format area F1 (as shown in FIGS. 2 and 3).

The connecting rod 13 and link grooves 13b and 13c serve both to symmetrically move the first and second masking members 11 and 12 and to guide the motion of the first and second masking members 11 and 12, depending on how the disk member 22 is moved. The link grooves 13b and 13c allow vertical play so that the first and second masking members 11, 12 may move vertically with reference to the connecting rod 13.

A pivotable pusher rod 14, having a driving link groove 14c at one end, is connected to the second masking member 12 via the driven link pin 12c The driven link groove 14c, running horizontally, allows horizontal play so that the second masking member 12 may move horizontally with reference to the driving link groove 14c. The pusher rod 14 is pivotable about an axis pin 14a connected to the camera body at its approximate lengthwise center, and has a pusher pin 14b at an end opposite the connection to the driving link groove 14c.

The first and second masking members 11 and 12 are biased towards each other by a returning coil spring 15 extending between the hook arm 12a of the second masking member 12 and the second driven arm 11b of the first masking member 11.

The position of the masking mechanism shown in FIGS. 2 and 3 defines a frame area corresponding to the standard frame format area F1, in this case the normal frame size and shape for 35 mm film (24 mm×36 mm). The area A of FIGS. 2 and 3 denotes the maximum frame size available, in this case, the area A is defined by the boundaries of the frame opening 23 of the camera. The maximum possible size defined is a "High-Vision" format having an approximate dimensional ratio of 9:16; that is, approximately 24 mm×42.5 mm.

In the "neutral" or default position of FIGS. 2 and 3, the first masking member 11 is vertically positioned to define the upper boundary of the (standard) frame format area F1 by the abutting of the horizontal surface of the stepped portion 11b' to the first driving pin 22a. At the same time, the first masking member 11 is horizontally positioned to define the right boundary of the standard format F1 by the abutting of the side of the second driven arm 11b to the first regulating member 1a, and is biased towards the first regulating member 1a by the returning coil spring 15. The second masking member 12 is vertically positioned to define the lower boundary of the standard format F1 by the contact of the hook surface 12a' to the second driving pin 22c. At the same time, the second masking member 12 is horizontally positioned to define the left boundary of the (standard) frame format area F1 by the abutting of the side of the hook arm 12a to the second regulating member 1b, and is biased towards the second regulating member 1b by the returning coil spring 15. In these positions, the first and second masking members 11 and 12 mask the full frame area A on left and right sides, while leaving the top and bottom of the full frame area A unmasked, thus achieving the standard format area F1.

The frame format area Fn can be adjusted by the user by rotating the format selector dial 21, thereby rotating the disk member 22. Alternatively, the disk member 22 could be rotated by a motor, and controlled to rotate the disk member 22 by a certain amount in forward or reverse directions.

Figure 4:
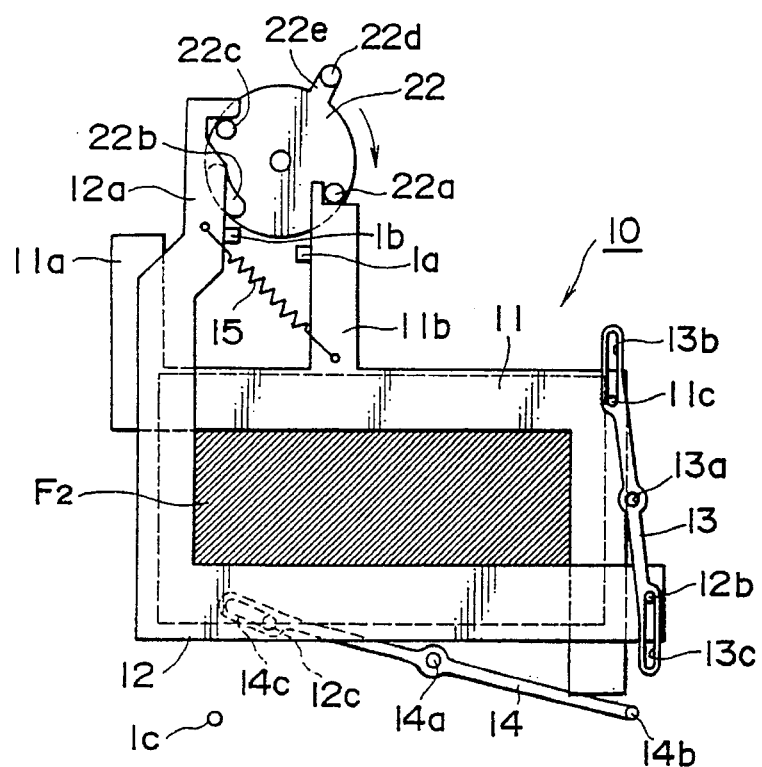
FIG. 4 is a plan view of the first embodiment of a frame masking mechanism showing a second frame format area F2 setting (first panorama setting)

When the format selector dial 21 is rotated clockwise from the position shown in FIG. 3 to that shown in FIG. 4, the frame format area F1 (standard format) is changed to a (first panoramic) frame format area F2.

As the disk member 22 is rotated clockwise by the format selector dial 21 from the position shown in FIG. 3, the positions of the first masking member 11 and the second masking member 12 remain regulated in the horizontal direction by the first and second regulating members 1a and 1b, respectively, and the returning coil spring 15. Thus, the left and right boundaries of the frame format area remain the same. However, the first driving pin 22a pushes down the first masking member 11 via the stepped portion 11b' of the second driven arm 11b, while the second driving pin 22c pulls up the second masking member 12 via the hook 12a' of the hook arm 12a. During this movement of the members 11 and 12, the top link pin 11c and bottom link pin 12b slide vertically, in opposite directions, within the top and bottom link grooves 13b, 13c, respectively. Meanwhile, the pusher rod 14 is pivoted clockwise as the second masking member moves upward, but has no effect on other parts of the mechanism.

Thus, as the disk member 22 arrives at the position shown in FIG. 4, a frame format area F2 is defined. The frame format area F2 is a first panoramic format having the same width but a reduced height when compared to the (standard) frame format area F1.

Figure 5:
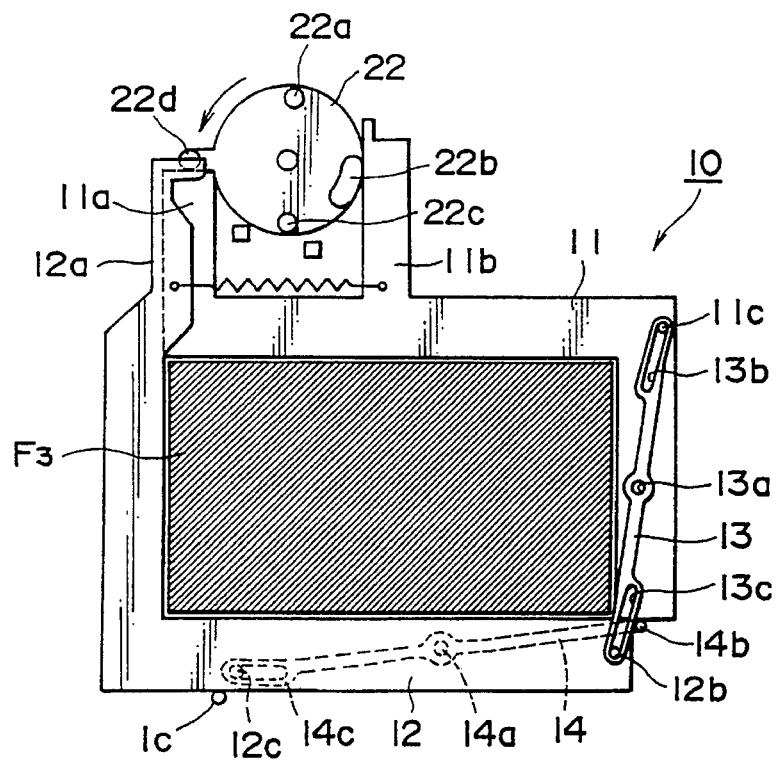
FIG. 5 is a plan view of the first embodiment of a frame masking mechanism showing a third frame format area F3 Setting (High-Vision setting)

When the format selector dial 21 is rotated counterclockwise from the position shown in FIG. 3 to that shown in FIG. 5, the frame format area F1 (standard format) is changed to a High-Vision frame format area F3.

As the disk member 22 is rotated counterclockwise by the format selector dial 21 from the position shown in FIG. 3, the arcuate driving member 22b pushes the first masking member 11 to the right, while the first and second masking members 11, 12 are regulated in the vertical direction by the third regulating member 1c and the pusher pin 14b. The connecting rod 13 is pushed clockwise by the rightward action of the top link pin 11c in the top link groove 13b, thereby acting to push the second masking member 12 leftward via the bottom link groove 13c and bottom link pin 12b. The driven link pin 12c is free to slide in a horizontal direction in the driving link groove 14c. The masking members 11, 12 are thereby moved in opposite directions away from the respective regulating members 1a, 1b. The top and bottom boundaries of the frame format area remain the same, while the left and right boundaries widen. Thus, as the disk member 22 arrives at the position shown in FIG. 5, a third frame format F3 is defined. The third frame format area F3 corresponds to a High-Vision format having the same height but an increased width when compared to the standard frame format area F1.

Figure 6:
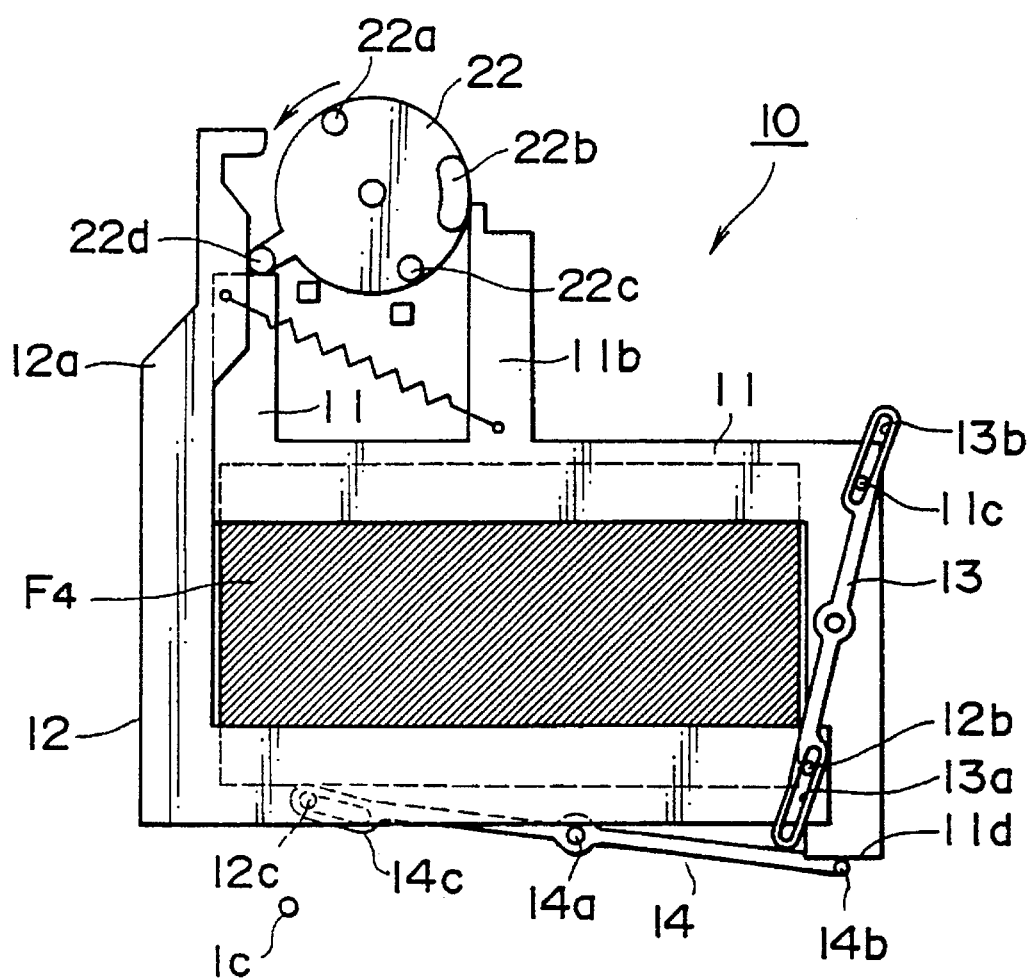
FIG. 6 is a plan view of the first embodiment of a frame masking mechanism showing a fourth frame format area F4 setting (second panorama setting)

When the format selector dial 21 is rotated further Counterclockwise from the position shown in FIG. 5 to that shown in FIG. 6, the frame format area F3 (High-Vision format) is changed to a second panoramic frame format area F4. The second panoramic frame format area F4 has the same height as the first panoramic frame format area F2, but is significantly wider.

As the disk member 22 is rotated further counterclockwise by the format selector dial 21 from the position shown in FIG. 5, the arcuate driving member 22b continues to hold the first masking member 11 at the wider position. The connecting rod 13 also holds the second masking member 12 in the rightward, wider position. The driven link pin 12c is free to slide in a horizontal direction in the driving link groove 14c, but drives the second masking member in the vertical direction. The outboard driving pin contacts the contact-surface 11a' of the first driven arm 11a, pushing-it downwards. Consequently, the bottom surface 11d of the first masking member pushes the pusher pin 14b downwards, which pivots the pusher rod 14 in a clockwise direction about the axis pin 14a, and finally pushes the second masking member upwards via the driven link pin 12c and the driving link groove 14c. The masking members 11, 12 are thereby moved toward each other in the vertical direction. The left and right boundaries of the frame format area remain the same, while the top and bottom boundaries narrow. Thus, as the disk member 22 arrives at the position shown in FIG. 6, a fourth frame format F4 is defined. The fourth frame format area F4 corresponds to a second panoramic format having a reduced height but an increased width when compared to the standard frame format area F1.

Figure 8:
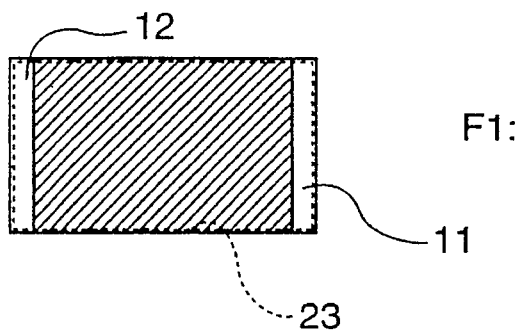
FIG. 8 is a schematic diagram showing different masking positions of masking members in relation to a frame opening.
Figure 8:
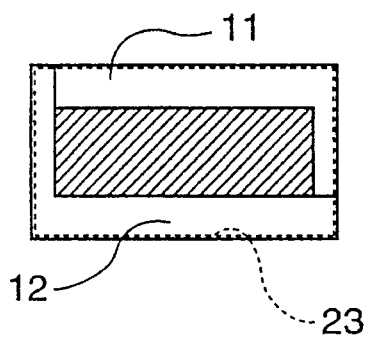
Figure 8:
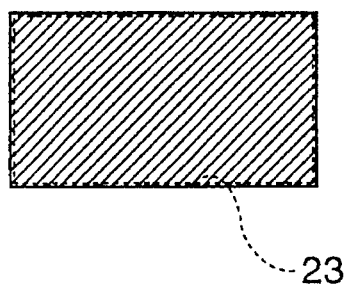
Figure 8:
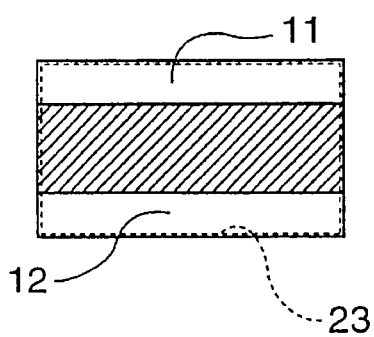

FIG. 8 shows a diagram of the four frame format areas F1 through F4. In FIG. 8, only the actively masking portions of the masking members 11, 12 are shown; for example, to achieve the frame format area F1, only the left and right (vertical) portions of the masking members 11, 12 mask the frame opening 23, while the top and bottom (horizontal) portions are idle. Although the position of the masking members 11, 12 shown in FIG. 3 (frame format area F1) is the mechanically neutral position, the masking members 11, 12 can be considered to have been moved from a non-masking position (frame format area F3) to mask the frame opening. Therefore, although the position shown in FIG. 3 (frame format area F1) is the neutral position mechanically, the position shown in FIG. 5 (frame format area F3) is the basic, non-masked position for reference purposes.

In the context of this specification, "unidirectional" shall mean "rectilinearly in one of horizontal or vertical directions". As shown in FIG. 8, for the frame format area F3, the first masking member 11 and second masking member 12 do not mask the frame opening 23. For the frame format area F1, the first masking member 11 and second masking member 12 have been moved unidirectionally in mutually opposite horizontal directions to mask vertical sides of the frame opening 23. For the frame format area F2, the first masking member 11 and second masking-member 12 have been moved cooperatively in mutually opposite vertical directions and in mutually opposite horizontal directions to mask both horizontal sides and vertical sides of the frame opening 23. For the frame format area F4, the first masking member 11 and second masking member 12 have been moved unidirectionally in mutually opposite vertical directions to mask horizontal sides of the frame opening 23.

Although the mechanism described achieves four different frame format areas F1 through F4, the invention can be arranged with a subset of three of these four, i.e., a set of F1, F3, and F4, a set of F2, F3, and F4, a set of F1, F3, and F4, or any other combination of three different frame format areas.

Furthermore, although the positions shown in FIGS. 3 through 6 show discrete positions defining four different frame format areas F1 through F4, with the provision of a holding or resistance element, the invention can be applied using the described mechanism such that the mechanism can be stopped at any position between the, discrete positions, allowing a continuously variable cropping function within the control of the user at the time of photographing.

In the embodiment described, the second driving pin 22c and hook 12a' are used for vertically moving the second masking member 12 to the position shown in FIG. 4. However, an alternative embodiment is found by linking the end of the pusher rod 14 at the pusher pin 14b to the bottom of the first masking member 12, by a connection allowing only horizontal play. In this case, the hook 12a' and second driving pin 22c are eliminated. Hence, the second driving pin 22c and hook 12a' may be considered part of a linkage (the linkage including the pusher rod 14 and its connections) for moving the first and second masking members 11 and 12 in mutually opposite directions.

Figure 7:
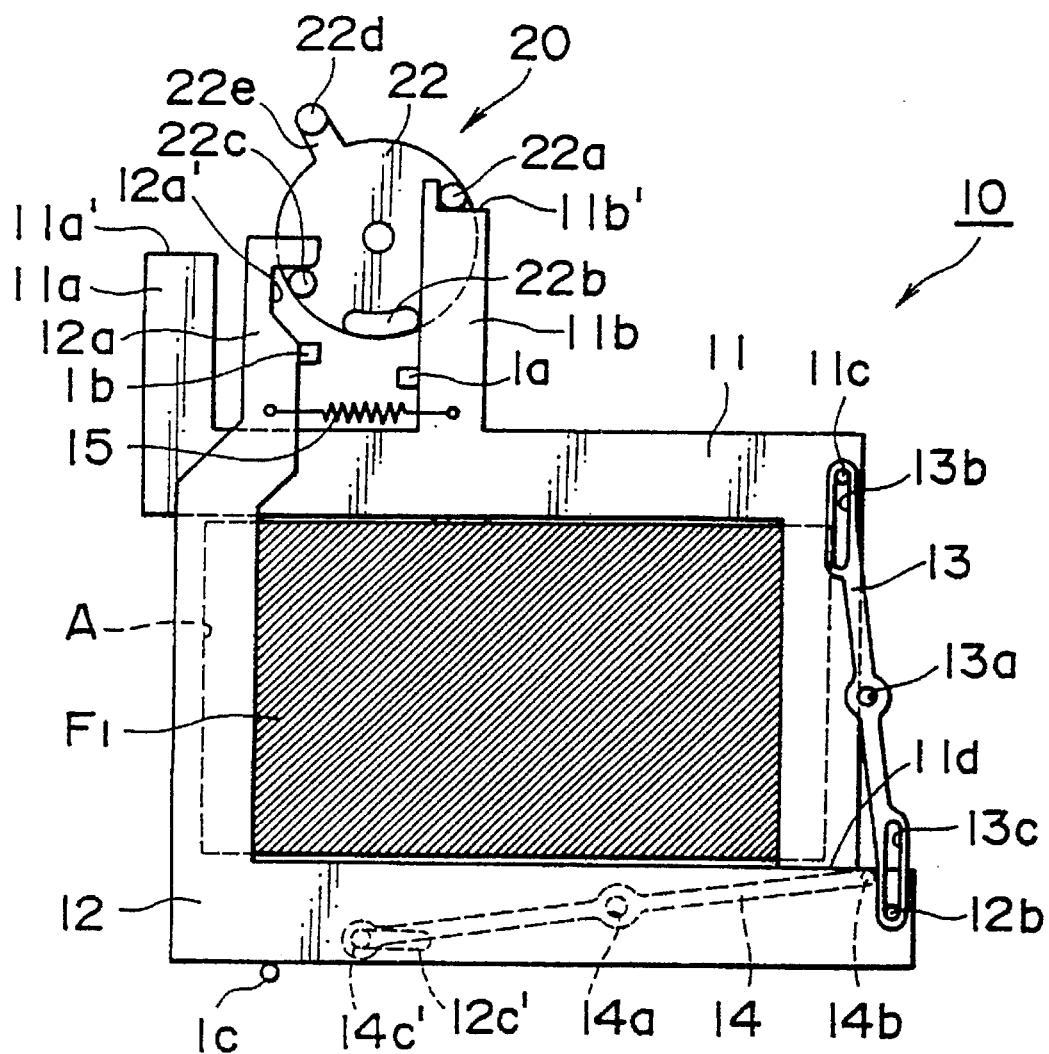
FIG. 7 is a plan view of a second embodiment of a frame masking mechanism, showing the first frame format area F1 setting.

Although the connecting rod 13 has at either end grooves formed at 13b, 13c, and mated to pins 11c, 12b, the connection may be any such that allows vertical play only. Similarly, although the pusher rod 14 has a groove 14c mated to a pin 12c at one end, and a pin 14b mated to a surface 11d at the other, the Connection may be any such that allows horizontal play only. An example of this kind of variation is shown in FIG. 7 as a second embodiment. In FIG. 7, the groove 14c becomes a pin 14c', and the pin 12c becomes a groove 12c', although the operation is virtually identical.

Thus, as described herein, the embodiment of a frame masking mechanism 10 according to the invention is able to mask a full size frame in a horizontal direction, a vertical direction, or both. In this manner, a variety of different photograph shapes and sizes can be achieved.

Furthermore, since the maximum possible size of a frame is the High Vision size (larger than the standard size), the mechanism can be effectively used to frame photographs in larger formats as well as smaller formats, in comparison to conventional "panorama" mechanisms.

Still furthermore, although the embodiment utilizes a format selector dial 21 to rotate the disk member 22, alternatively, the disk member 22 could be rotated by a motor controlled to rotate the disk member 22 by a certain amount in forward or reverse directions.

The present disclosure relates to subject matter contained in Japanese Patent Application No. HEI 06-234308, filed on Sep. 2, 1994, which is expressly incorporated herein by reference in its entirety.

What is claimed is:

1. A frame masking mechanism for a camera, comprising:
   a rectangular frame opening formed in said camera for defining a largest image formed by light admitted to a film plane of said camera;
   horizontal side masking means for masking said frame opening at horizontal sides of said frame opening by blocking light at said horizontal sides of said frame opening;
   vertical side masking means for masking said frame opening at vertical sides of said frame opening by blocking light at said vertical sides of said frame opening;
   first moving means for moving one of said horizontal side masking means to mask said frame opening at said horizontal sides and said vertical side masking means to mask said frame opening at said vertical sides;
   second moving means for simultaneously moving said horizontal and said vertical side masking means to mask said frame opening at both of said horizontal sides and said vertical sides of said frame opening; and
   an operating member for selectively operating said first moving means and said second moving means.

2. The frame masking mechanism according to claim 1, wherein said operating member selectively operates one of said first moving means and said second moving means to move at least one of said horizontal side masking means and said vertical side masking means between a first position where said vertical masking means masks vertical sides of said frame opening, a second position where said frame is not masked, a third position where said horizontal masking means masks horizontal sides of said frame opening and said vertical masking means masks vertical sides of said frame opening, and a fourth position where said horizontal masking means masks horizontal sides of said frame opening.

3. The frame masking mechanism according to claim 1, wherein said horizontal side masking means is movable to block light at both top and bottom horizontal sides of said frame opening, and said vertical side masking means is movable to block light at both left and right vertical sides of said frame opening.

4. The frame masking mechanism according to claim 3, said horizontal side masking means comprising: top and bottom masking members; and
   said vertical side masking means comprising: left and right masking members, and
   said mechanism further comprising:
      means for simultaneously moving said top and bottom masking members in mutually opposite directions; and
      means for simultaneously moving said left and right masking members in mutually opposite directions.

5. The frame masking mechanism according to claim 4, said top and right masking members unitarily formed as a first L shaped masking member, and
   said left and bottom masking members unitarily formed as a second L shaped masking member.

6. The frame masking mechanism according to claim 5, said means for simultaneously moving said right and left masking members in mutually opposite directions comprising:
   a first linking means, linking said first and second L shaped masking members, for simultaneously moving said first and second masking members in mutually opposite horizontal directions, and
   wherein said means for simultaneously moving said top and bottom masking members in mutually opposite directions comprises:
   a second linking means, linking said first and second L shaped masking members, for simultaneously moving said first and second masking members in mutually opposite vertical directions.

7. The frame masking mechanism according to claim 6, wherein said operating member is movable to different positions to operate one of said first moving means and said second moving means in response to different positions of said operating member, wherein said operating member is operable to move said first and second L shaped members to mask said frame opening only at said vertical sides, to move said first and second L shaped members to mask said frame opening only at said horizontal sides, and to move said first and second L shaped members to simultaneously mask said frame opening at said horizontal and said vertical sides.

8. The frame masking member according to claim 7, wherein said operating member is rotatably positionable to operate one of said first moving means and said second moving means to move said first and second L shaped masking members in response to different angular positions of said operating member.

9. A frame masking mechanism for a camera, comprising:
   a rectangular frame opening formed in said camera for defining a largest image formed by light admitted to a film plane of said camera;
   a first L shaped masking member for masking two adjacent sides of said frame opening by blocking light at said adjacent sides of said frame;
   a second L shaped masking member for masking two remaining adjacent sides of said frame opening by blocking light at said remaining adjacent sides of said frame;

means for horizontally moving said first and second L shaped masking members in mutually opposite horizontal directions to mask horizontal sides said frame opening;

means for vertically moving said first and second L shaped masking members in mutually opposite vertical directions to mask vertical sides of said frame opening; and a selector for operating at least one of said horizontally moving means and said vertically moving means, to unidirectionally move said first and second L shaped masking member to mask said frame opening only at said vertical sides, to unidirectionally move said first and second L shaped masking members to mask said frame opening only at said horizontal sides, and to move said first and second L shaped masking members to cooperatively mask said frame opening at said horizontal and said vertical sides.

10. The frame masking mechanism according to claim 9, said horizontally moving means comprising:

a first driving member provided to said selector for driving at least one of said first and second L shaped masking members in a horizontal direction; and a first linkage for linking said first and second L shaped masking members to move in mutually opposite horizontal directions, and said vertically moving means comprising:

a second driving member provided to said selector for driving at least one of said first and second L shaped masking members in a vertical direction; and a second linkage linking for said first and second L shaped masking members to move in mutually opposite vertical directions.

11. The frame masking mechanism according to claim 10, said selector further comprising:

a third driving member for driving at least one of said first and second L shaped masking members in a vertical direction while said second driving member drives said at least one of said first and second L shaped masking members in said horizontal direction.

12. The frame masking member according to claim 11, wherein said first, second, and third driving members are arranged about a periphery of said selector to selectively position said first and second L shaped masking members according to a rotational position of said selector.

13. The frame masking member according to claim 10, wherein said first linkage is linked to said first and second L shaped masking members by connections having vertical play, and wherein said second linkage is linked to said first and second L shaped masking members by connections having horizontal play.

14. A frame masking mechanism for a camera, comprising:

a rectangular frame opening formed in said camera for defining a largest image formed by light admitted to a film plane of said camera;

a first L shaped masking member for masking two adjacent sides of said frame opening by blocking light at said adjacent sides of said frame;

a second L shaped masking member for masking two remaining adjacent sides of said frame opening by blocking light at said remaining adjacent sides of said frame;

a driving disk for selectively driving at least one of said first and second L shaped masking members in at least one of a vertical direction to mask said frame opening at vertical sides; in a horizontal direction to mask said frame opening at horizontal sides; and in both a vertical direction and a horizontal direction to mask said frame opening at both said vertical and horizontal sides;

a first linkage for moving said second L shaped masking member and said first L shaped masking member in mutually opposite horizontal directions in response to a horizontal movement of one of said first and second L shaped masking members; and a second linkage for moving said second L shaped masking member and said first L shaped masking member in mutually opposite vertical directions in response to the vertical movement of one of said first and second L shaped masking members.

15. The frame masking mechanism according to claim 14, said driving disk comprising:

a first projection provided to a periphery of said driving disk, for contacting and vertically moving said first L shaped masking member in response to a rotation of said driving disk;

a second projection provided to said periphery of said driving disk, for contacting and horizontally moving said first L shaped masking member in response to a rotation of said driving disk; and a third projection provided to said periphery of said driving disk, for contacting and vertically moving said first L shaped masking member, while said second projection is horizontally moving said first L shaped masking member, in response to a rotation of said driving disk.

16. The frame masking mechanism according to claim 15, wherein said first projection contacts and moves said first L shaped masking member in response to a rotation of said driving disk in a first direction, and said second projection contacts and moves said first L shaped masking member in response to a rotation of said driving disk in a second direction opposite to said first direction, and said third projection contacts and moves said first L shaped masking member in response to a further rotation of said driving disk in said second direction.

17. The frame masking mechanism according to claim 16, wherein second L shaped masking member is movable in an opposite horizontal direction to said first L shaped masking member by said first linkage, and in an opposite vertical direction to said first L shaped masking member by said second linkage, in response to the second projection contacting and moving said first L shaped masking member in a horizontal direction while said third projection contacts and moves said first L shaped masking member in a vertical direction.

18. The frame masking mechanism according to claim 17, wherein said first linkage is linked to said first and second L shaped masking members by connections having vertical play, and wherein said second linkage is linked to said first and second L shaped masking members by connections having horizontal play.

19. The frame masking mechanism according to claim 16, further comprising:

at least a first regulating member for regulating the horizontal movement of said first and second L shaped masking member to a predetermined amount of masking of said horizontal sides of said frame opening; and at least a second regulating member for regulating the vertical movement of said first and second L shaped masking members to a predetermined amount of masking of said vertical sides of said frame opening.

20. The frame masking mechanism according to claim 19, further comprising;

at least one resilient member for biasing one of said first and second L shaped masking members to contact said at least a first regulating member.

21. A frame masking mechanism for a camera, comprising:

a rectangular frame opening formed in said camera for defining a largest image formed by light admitted to a film plane of said camera;

first side masking means for masking said frame opening at first opposing sides of said frame opening by blocking light at said first opposing sides of said frame opening;

second side masking means for masking said frame opening at second opposing sides of said frame opening by blocking light at said second opposing sides of said frame opening, said second opposing sides being perpendicular to said first opposing sides;

first moving means for moving at least one of said first side masking means in a first direction and said second side masking means in a second direction to mask said frame opening at one of said first opposing sides and second opposing sides of said frame opening, respectively;

second moving means for simultaneously moving said first and second side masking means to mask said frame opening at said first opposing sides and said second opposing sides of said frame opening; and an operating member for selectively operating said first moving means and said second moving means.

22. A frame masking mechanism for a camera, comprising:

a rectangular frame opening in said camera for defining a largest image formed by light admitted to a film plane of said camera;

horizontal side masking means for masking said frame opening at horizontal sides of said frame opening by blocking light at said horizontal sides of said frame opening;

vertical side masking means for masking said frame opening at vertical sides of said frame opening by blocking light at said vertical sides of said frame opening;

first means for moving one of said horizontal side masking means to change a frame format area of said frame opening in a vertical direction and said vertical side masking means to change said frame format of said frame opening in a horizontal direction;

second means for simultaneously moving said horizontal and said vertical side masking means to mask said frame format area at both of said vertical and said horizontal direction of said frame; and an operating member for selectively operating said first and second moving means.

* * * * *

UNITED STATES PATENT AND TRADEMARK OFFICE
CERTIFICATE OF CORRECTION

PATENT NO. : 5,602,606
DATED : February 11, 1997
INVENTOR(S) : Kazuki YAZAWA

It is certified that error appears in the above-identified patent and that said Letters Patent is hereby corrected as shown below:

At column 11, line 5 (claim 9, line 14), change "horizontal" to --vertical--.
At column 11, line 9 (claim 9, line 18), change "vertical" to --horizontal--.
At column 11, line 33 (claim 10, line 13), change "linking for" to --for linking--.
At column 12, line 4 (claim 14, line 16), change "vertical" to --horizontal--.
At column 12, line 5 (claim 14, line 17), change "horizontal" to --vertical--.
At column 12, line 66 (claim 19, line 5), change "horizontal" to --vertical--.
At column 13, line 4 (claim 19, line 9), change "vertical" to --horizontal--.

Signed and Sealed this

Twenty-eighth Day of March, 2000

Attest:

Q. TODD DICKINSON

*Attesting Officer*  *Commissioner of Patents and Trademarks*